Patented Sept. 3, 1935

UNITED STATES PATENT OFFICE 2,013,456

PROCESS FOR THE PRODUCTION OF YEAST

Hans Braasch and Arnold Braasch, Neumunster, Holstein, Germany, assignors to Standard Brands Incorporated, New York, N. Y., a corporation of Delaware No Drawing. Application January 14, 1933, Serial No. 651,859. In Germany January 15, 1932

5 Claims. (Cl. 195—20)

The invention relates to a process for the production of yeast, such as bakers' yeast, fodder yeast or the like.

In the production of yeast, especially of bakers' yeast, artificial aeration of the fermenting wort is frequently employed. The importance of the artificially supplied air has become increasingly recognized and has given rise to aeration processes of various kinds. With an increased supply of air an increased propagation of the yeast takes place.

Applicants have observed that, on greatly increasing the artificial aeration, a surprising slackening in the development of the yeast takes place. In their experiments, that they made in connection with this observation, they found that with very greatly increased aeration, in spite of the presence of sugar etc. in many cases, there were found a cessation of the fermentation, stoppage of the germination of cells, a great lessening of the formation of froth and, finally, the absence of carbon dioxide in the waste air of the fermenting vat. If now such a specially strong aeration was continued to such an extent that the fermentation practically ceased, abundant presence of dead yeast cells could be found after a few hours. In the case of a yeast that was so thoroughly over aerated, a feeble fermentation could again be observed only some hours after even complete cessation of the aeration.

Now the applicants have made the discovery that, in the presence of certain minimum quantities of carbon dioxide, the phenomonon of the cessation of the fermentation, owing to very powerful aeration, did not occur, and that even in a wort in which the fermentation, as above described, had wholly ceased in consequence of the excessively powerful aeration, the fermentation was again very soon revived by passing in carbon dioxide. In this case, the yeast cells rapidly recovered and germinated satisfactorily and the fermentation followed its normal course.

By the process of the invention, provision is made that there should always be present in the fermenting wort as long as the propagation of the yeast is desired, especially with powerful aeration, such a quantity of carbon dioxide that the fermentation does not suffer.

According to the invention, carbonic acid is added to the air introduced into the fermenting wort during the propagation period. Advantageously, more than 0.5% of carbon diovide is employed; specially good results are obtained with 1 to 3% of carbon dioxide.

The carbon dioxide may be taken from any desired source; for example, waste air containing carbon dioxide from the same or another fermenting vat may be added to the fresh aerating air. Fermenting vats with slight or no artificial aeration may, in many cases, serve specially advantageously as the source of carbon dioxide. The mixing of the fresh air with the carbonic acid or with the waste air containing carbon dioxide may be effected in any desired manner. The supply of the fresh air mixed with carbon dioxide is effected preferably by suitable devices for very or extremely fine aeration.

The observations of the applicants and the present process that is based on these observations are contrary to the general view of the fermentation industry. Thus, for example, Euler and Lindner, in "Chemie der Hefe und der Alkoholischen Gärung" (Leipzig 1915, page 284) whilst referring to Delbrück on the harmful influence of carbon dioxide in fermentation, say definitely that the removal of the carbon dioxide from the fermenting solution must always be aimed at in the art of fermentation. They go as far as to state with Delbrück that the favorable influence of the aeration rests for the larger part precisely on the removal of the carbon dioxide.

Even in recent literature, e. g., "Handbuch der Spiritusfabrikation" by Dr. Georg Foth, Berlin-Charlottenburg, published by Paul Parey, Berlin, 1929, pages 75 and 76, there are found similar warnings against the harmful influence of carbon dioxide on the growth of yeast.

One of the applicants had already previously ascertained that certain advantages were afforded by causing the same quantities of air to pass repeatedly through the wort during the maturing period of the yeast. In these older statements, however, it was always assumed that, during the period of propagation of the yeast, it was, in agreement with the general view of the fermentation industry, necessary to work with fresh air.

The process according to the invention affords a series of advantages. A new means is available for accurately regulating the course of the fermentation. The advantages attaching to a very powerful aeration with regard to the rapid development of a good yeast are fully utilized without having to put up with the disadvantages connected therewith; there is thus no over-aeration. A distinct improvement in the color and smell of the yeast is effected and the yield is increased.

A further important advantage is that the presence of artificially increased quantities of carbon dioxide in the fermentation renders difficult or prevents the development of any harmful bacteria that may be present. Such a development is favored by the increased aeration employed in the recent methods of yeast production.

A fermenting wort having a usual composition and pitched with seed yeast is aerated in a known manner. As soon as a brisk fermentation has set in, a portion of the waste gases of the fermentation is sucked out of the same vat and mixed with the fresh air so that the air supplied to the fermenting wort contains about 1 to 3% of carbon dioxide. The quantity of carbon dioxide depends upon the magnitude of the yeast seeding, the concentration of the wort, the strength of the aeration and the temperature of fermentation and can be employed during the whole propagation period or with interruptions.

Example 1

1000 kg. molasses are diluted with 2000 kg. of water, slightly acidified, heated to 80° C. and filtered. The molasses purified in this way is continuously introduced into a fermenting vat of about 30 cbm. content within a period of about 8 hours, the rate of introduction being progressively elevated.

At the beginning of the introduction of the molasses, the vat is filled with about 20 cbm. of water at a temperature of 30° C. wherein 200 kg. seed yeast are distributed. Corresponding to the introduced molasses, nutrient salts such as 25 kg. diammonium phosphate, 10 kg. ammonium sulphate, 41 kg. ammonium water are added. Simultaneously with the beginning of the introduction of molasses, the fermentation liquid is aerated. The air is introduced by a system of pipes provided with fine holes and situated at the bottom of a vat. At the beginning about 800 cbm. of air are necessary per hour. After the yeast begins to ferment, the quantity of the air is elevated up to 2500 cbm. per hour. To the fresh air introduced into the vat, at the beginning of the fermentation, there is admixed carbon dioxide in the proportion of about 3% of the air, i. e. 24 liters carbon dioxide to 800 cbm. air. Practically the same proportion of admixed carbon dioxide is maintained during several hours. In the last few hours the amount of carbon dioxide may be further increased, for example, up to 6% of the volume of fresh air. The carbon dioxide may of course be supplied from a steel container. After the yeast has been duly ripened, the yeast is separated and pressed in the usual manner. From 1000 kg. molasses there are obtained 850 kg. pressed yeast of an especially fine color and agreeable aromatic flavor.

Example 2

The amounts of materials and liquids are the same as in Example 1. Instead of employing a system of perforated pipes, finely porous diaphragms are used for introducing the air. In consequence of the much finer subdivision of the air, there are now only used 10% of the volumes of air indicated in Example 1, i. e., at the beginning, 80 cbm. of air and during the main part of the fermentation, 250 cbm. per hour. The proportion of carbon dioxide remains the same as in Example 1, at the beginning and during the main part of the fermentation 3%, in the last hours up to 6% of the amount of the fresh air introduced. In consequence of the substantial reduction of the amount of air the carbon dioxide content of the waste gases is much larger than the carbon dioxide content of the waste gases in Example 1. In the present case the waste gases during the main part of the fermentation contain up to 15% carbon dioxide. These waste gases are drawn off by means of a compressor and are added to the fresh air in the necessary percentage to make up the desired proportion of carbon dioxide in the air. The content of carbon dioxide in the added air is tested and controlled by means of a carbon dioxide testing apparatus (Orsat). From 1000 kg. molasses 1050 kg. yeast of the type described in Example 1 are produced. The higher and more economical output is due to the better subdivision of air by means of the fine diaphragms.

What we claim is:—

1. In a process for the production of yeast, which includes propagating yeast in a yeast-nutrient containing liquid, the feature which comprises continuously introducing into said yeast-nutrient containing liquid throughout the entire period of propagation, a supply of air containing a quantity of carbon dioxide ranging from about 1% up to a maximum of about 3% of said supply.

2. In a process for the production of yeast, which includes propagating yeast in a yeast-nutrient containing liquid, the feature which comprises continuously introducing into said yeast-nutrient containing liquid substantially throughout the period of propagation, a supply of air containing carbon dioxide, the percentage of carbon dioxide therein lying between 0.5% and a maximum of about 3%.

3. In a process for the production of yeast, which includes propagating yeast in a yeast-nutrient containing liquid, with the evolution of waste gases including carbon dioxide, the features which comprise continuously introducing into said yeast-nutrient containing liquid substantially throughout the period of propagation a supply of air containing carbon dioxide, the percentage of carbon dioxide lying between about 1% and a maximum of about 3%, collecting a part of the waste carbon dioxide bearing gases evolved during propagation in said liquid and adding said part of said waste gases to the supply of air being introduced into said liquid.

4. In a process for the production of yeast, which includes propagating yeast in a yeast-nutrient containing liquid, with the evolution of waste gases including carbon dioxide, the features which comprise continuously introducing into said yeast-nutrient containing liquid substantially throughout the period of propagation a supply of air containing carbon dioxide, the percentage of carbon dioxide lying between 0.5% and a maximum of about 3% of said supply, collecting a part of the waste carbon dioxide bearing gases evolved during propagation in said liquid and adding said part of said waste gases to the supply of air being introduced into said liquid.

5. In a process for the production of yeast, which includes propagating yeast in a yeast-nutrient containing liquid, the step which comprises continuously introducing into said yeast-nutrient containing liquid substantially throughout the period of propagation, a supply of air containing carbon dioxide, the percentage of carbon dioxide therein lying between about 0.5% and a maximum which is in accordance with the magnitude of the yeast seeding and of the order of about 3%.

HANS BRAASCH.
ARNOLD BRAASCH.